Oct. 24, 1933. A. LEIB Re. 18,972

ARRANGEMENT FOR WIRELESS TELEGRAPHY AND TELEPHONY

Original Filed March 26, 1923

INVENTOR
AUGUST LEIB
BY H. S. Grover
ATTORNEY

Reissued Oct. 24, 1933 Re. 18,972

UNITED STATES PATENT OFFICE 18,972

ARRANGEMENT FOR WIRELESS TELEGRAPHY AND TELEPHONY

August Leib, Berlin, Germany, assignor to Telefunken Gesellschaft fur Drahtlose Telegraphie mit beschrankter Haftung, Berlin, Germany, a corporation of Germany Original No. 1,754,326, dated April 15, 1930, Serial No. 627,828, March 26, 1923, and in Germany July 4, 1922. Application for reissue September 26, 1930. Serial No. 484,672

18 Claims. (Cl. 250—27)

The present invention relates to an arrangement for wireless telegraphy and telephony and is particularly intended for use in receivers in which a device, which operates in synchronism with the varying tuning means, is employed to render the indicator such as a detector, an amplifier, a telephone, etc., ineffective for certain points or parts of a wave band. Due to this arrangement at certain selectable points of the band of wave lengths to which the receiver may be tuned by the tuning means, receiving is made impossible, and therefore these bands or ranges may be barred from, e. g., unauthorized radio receiving. This may be attained by a switch device which is mechanically connected with the variable condenser or variometer of a tuned circuit of the receiver. By this device the detector, the telephone receiver or the amplifier circuits may be temporarily disconnected or short circuited so as to prevent reception.

Figure 1:
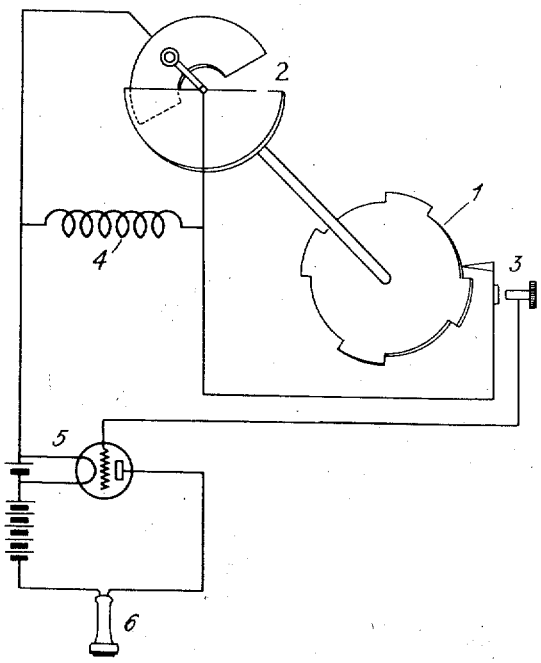
Figure 2:
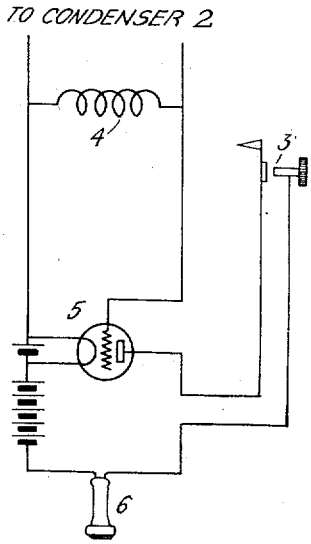
Figure 3:
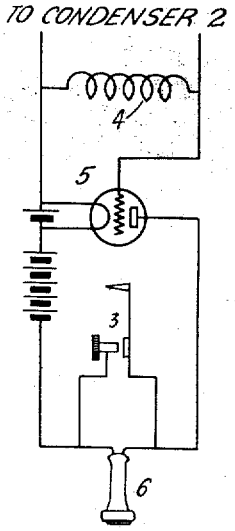

Fig. 1 of the drawing schematically illustrates one embodiment of my invention, Fig. 2 is a modified form showing a connection to interrupt the anode circuit of the tube, and Fig. 3 is another modified form showing a connection to short-circuit the telephone receiver. The parts not shown in Fig. 2 are similar to those of Fig. 1 and the connections likewise similar.

As shown, a disc 1 having a toothed periphery is fixed on the shaft of the variable condenser 2 of an oscillating circuit in a receiver. This disc cooperates with a contact device 3 and causes the opening and closing of this contact when during the rotation of the disc the contact engages depressed and raised portions respectively of its toothed periphery. The tuned circuit is completed by the self induction 4, and its tuning will continuously pass through the wave band of the receiver while the condenser 2 is being rotated. An indicator such, for example, as an audion 5 with a telephone receiver 6 is connected with the oscillating circuit of the receiver. The contact device 3 is in the conductor leading from the tuned circuit to the audion and will interrupt this connection while the movable member of contact device 3 rests in a notch of the disc 1. For this reason, receiving is prevented over a corresponding portion of the wave band. Obviously, the interruption may be effected in another part of the circuit arrangement of the receiver e. g. in the anode circuit of the tube, the heating circuit, etc.

The arrangement shown in Fig. 2 is similar to the arrangement shown in Fig. 1 except that in Fig. 2 the anode circuit is interrupted by the contact device 1 and 3.

The arrangement shown in Fig. 3 is similar to the arrangement shown in Fig. 2, except that in Fig. 3, the telephone receiver 6, or sound reproducer, is short-circuited by the contact device 1 and 3. As in Fig. 1, the disc 1 cooperates with the contact device 3 and causes short-circuiting of the reproducer 6 when during the rotation of the disc the contact engages depressed portions of its toothed periphery, the reproducer being rendered effective whenever the contact engages raised portions of the toothed periphery of the disc.

The invention is particularly intended for use in receiving apparatus in which the condenser 2 is continuously operated to repeatedly vary the tuning of the receiver over a band of wave lengths.

Having described my invention, what I claim is:

1. In a high frequency receiving system, a resonant circuit, means for varying the tuning of the circuit, a second circuit, and means operated by said tuning varying means for breaking said second circuit to prevent reception at certain wave lengths.

2. In a high frequency receiving system, receiving means, a signal responsive device, and means for continually and periodically placing said signal responsive device into and out of operative relation with said receiving means at predetermined separated values of the incoming signal wave lengths.

3. In a high frequency receiving system, a resonance circuit, means for continuously and periodically varying the tuning of said circuit through a band of wave lengths, and means for preventing reception at predetermined separated wave lengths of the band.

4. In a high frequency receiving system, a resonance circuit, means for continuously and repeatedly varying the tuning of said circuit through a band of wave lengths, and means operated by said first means for preventing reception at predetermined separated wave lengths of the band to which said receiving system is responsive.

5. In a high frequency receiving system, a resonant circuit, means for continuously and repeatedly varying the tuning of the circuit, and means operated by said tuning varying means for preventing reception at certain predetermined separated wave lengths in the signal band to which said receiving system is responsive.

6. In a high frequency receiving system, a resonance circuit, means for continuously and repeatedly varying the tuning of the circuit, a second circuit, and means operated by said tuning varying means for continuously and repeatedly breaking said second circuit to prevent reception at certain wave lengths.

7. In a high frequency receiving system, a circuit having a tuning device therein, a signal responsive device, circuit breaking means for controlling said signal responsive device, and rotating means for operating said tuning device and said circuit breaking means simultaneously continuously and repeatedly.

8. In a high frequency receiving system, a resonance circuit having a tuning device therein, an audion tube having input and output circuits, said input circuit being coupled to said resonance circuit, a circuit interrupter having contacts in one of said tube circuits, rotating means for controlling said tuning device and said circuit interrupter simultaneously, and a telephone in said output circuit.

9. In a high frequency receiving system, a resonance circuit including a condenser, means for controlling said condenser to vary the resonant frequency of said circuit, a second circuit, and means operated by said condenser-controlling means for making and breaking said second circuit to prevent reception at certain wave lengths.

10. In a receiving arrangement for wireless telegraphy and telephony, a resonant circuit, a continuously rotated condenser for continuously and repeatedly varying the tuning of the circuit through a band of wave lengths, a disc mounted on the shaft of the condenser and having a toothed periphery, and contacts controlled by said disc for breaking a circuit of the arrangement so as to prevent reception at certain of the wave lengths in said band.

11. In combination with a radio receiver having a reproducer connected thereto, means for tuning the receiver, and means controlled by the tuning means to render the reproducer ineffective during predetermined periods of the tuning process.

12. In a high frequency receiving system, a resonant circuit, means for varying the tuning of the circuit, a second circuit including a signal indicator, and means operated by said tuning varying means for rendering said second circuit ineffective between certain wave lengths.

13. In a high frequency receiving system, a resonant circuit including a condenser, means for controlling said condenser to vary the resonant frequency of the circuit, a second circuit including a reproducer, and means operated by said condenser-controlling means for rendering said second circuit ineffective between certain wave lengths.

14. In a high frequency receiving system, a resonant circuit, means for varying the tuning of the circuit, a reproducer, and means operated by said tuning varying means between predetermined wave lengths for rendering said reproducer ineffective.

15. In a high frequency system, a resonant circuit, means for varying the tuning of said circuit through a band of wave lengths, a signal indicator, and means for rendering the indicator ineffective between predetermined separated wave lengths of the band.

16. In a device for conditioning a radio receiver to receive radio waves from selected stations, said receiver having a circuit including a sound reproducer connected thereto, means to open the reproducer circuit during predetermined periods of the process of conditioning the receiver to receive a selected station.

17. In a high frequency receiving system, a resonant circuit, a tube having its input electrodes coupled to said circuit, a sound reproducer coupled to the output electrodes of said tube, means for varying the tuning of said circuit through a signal frequency range, and means for rendering the tube inefficient when said tuning means is varied between predetermined separated frequencies of said range whereby said reproducer is ineffective between said last named frequencies.

18. In a radio telephone receiver, a tube provided with at least a cathode, signal grid and anode, a resonant signal network coupled to the grid and cathode of the tube, a variable tuning condenser in said network for tuning said receiver through a signal frequency range, a sound reproducer coupled to the anode circuit of said tube, and means for rendering the tube inefficient during the process of tuning the receiver to receive a desired signal frequency whereby undesired sounds are prevented.

AUGUST LEIB.